United States Patent
Mattson et al.

(10) Patent No.: US 9,705,815 B2
(45) Date of Patent: Jul. 11, 2017

(54) GRAPH DATABASE FOR SERVICES PLANNING AND CONFIGURATION IN NETWORK SERVICES DOMAIN

(71) Applicant: Juniper Networks, Inc., Sunnyvale, CA (US)

(72) Inventors: Geoffrey A. Mattson, Palo Alto, CA (US); Lei Qiu, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 306 days.

(21) Appl. No.: 14/318,541

(22) Filed: Jun. 27, 2014

(65) Prior Publication Data
US 2015/0381515 A1    Dec. 31, 2015

(51) Int. Cl.
*G06F 12/00* (2006.01)
*G06F 17/30* (2006.01)
*H04L 12/911* (2013.01)
*H04L 12/24* (2006.01)

(52) U.S. Cl.
CPC ........ *H04L 47/70* (2013.01); *G06F 17/30958* (2013.01); *H04L 41/145* (2013.01); *H04L 41/5051* (2013.01)

(58) Field of Classification Search
CPC ................................................ G06F 17/30958
USPC .......................................................... 707/827
See application file for complete search history.

(56) References Cited

U.S. PATENT DOCUMENTS

| | | | |
|---|---|---|---|
| 7,970,782 B1 * | 6/2011 | Bedell | G06F 17/30563 707/760 |
| 8,700,801 B2 | 4/2014 | Medved et al. | |
| 2003/0037126 A1 * | 2/2003 | Spicer | H04L 41/28 709/220 |
| 2009/0328205 A1 | 12/2009 | Ims et al. | |

(Continued)

FOREIGN PATENT DOCUMENTS

WO    2013184846 A    12/2013

OTHER PUBLICATIONS

"JunosE™ Software for E Series™ Broadband Services Routers: Broadband Access Configuration Guide," Juniper Networks, release 14.1.x, Dec. 16, 2012, 814 pp.

(Continued)

*Primary Examiner* — Van Oberly
(74) *Attorney, Agent, or Firm* — Shumaker & Sieffert, P.A.

(57) ABSTRACT

In general, techniques are described for representing services, network resources, and relationships between such services and resources in a graph database with which to validate, provision, and manage the services in near real-time. In one example, a controller device includes at least one processor; and at least one memory to store a graph database comprising a graph that represents network resources and relationships between network resources. The controller device receives, at an application programming interface, a data-interchange formatted message that indicates a service request to configure a network service; queries, at least a portion of the plurality of the graph, to determine whether a set of the plurality of network resources can satisfy the service request to provision the network service within the network; and configures the set of the plurality of network resources to provide the network service.

21 Claims, 6 Drawing Sheets

(56) References Cited

U.S. PATENT DOCUMENTS

| | | | |
|---|---|---|---|
| 2012/0179503 A1* | 7/2012 | Chalana | G06Q 10/06 705/7.14 |
| 2012/0278365 A1* | 11/2012 | Labat | G06Q 10/06 707/798 |
| 2012/0281540 A1 | 11/2012 | Khan et al. | |
| 2013/0128883 A1 | 5/2013 | Lawson et al. | |
| 2013/0167199 A1 | 6/2013 | Said et al. | |
| 2013/0204849 A1 | 8/2013 | Chacko | |
| 2013/0250770 A1 | 9/2013 | Zou et al. | |

OTHER PUBLICATIONS

"Policy and Charging Control (PCC), Reference Points (Release 11)," 3GPP TS 29.212—Version 11.7.0, 3rd Generation Partnership Project, Technical Specification Group Core Network and Terminals, Dec. 2012, 196 pp.

"Policy and Charging Control Architecture (Release 10)," 3GPP TS 23.203—Version 10.1.0, 3rd Generation Partnership Project, Technical Specification Group Services and System Aspects, Sep. 2010, 131 pp.

Atlas et al., "Interface to the Routing System Framework: draft-ward-irs-framework-00," Network Working Group, Internet-draft, Jul. 30, 2012, 22 pp.

Vasseur et al., "Path Computation Element (PCE) Communication Protocol (PCEP)," Network Working Group, Request for Comments 5440, Mar. 2009, 88 pp.

U.S. Appl. No. 13/324,861, by Jan Medved et al., filed Dec. 13, 2011.

Extended Search Report from counterpart European Application No. 15174109.7, dated Oct. 28, 2015, 10 pp.

Bueno et al., "An OpenNaas Based SDN Framework for Dynamic QoS Control," IEEE SDN for Future Networks and Services, Nov. 2013, 7 pp.

Chase et al., "Joint Virtual Machine and Bandwidth Allocation in Software Defined Network (SDN) and Cloud Computing Environments," IEEE International Conference on Communications (ICC), Jun. 10-14, 2014, pp. 2969-2974.

Zhu et al., "Reliable Resource Allocation for Optically Interconnected Distributed Clouds," IEEE International Conference on Communications (ICC), Jun. 10-14, 2014, pp. 3301-3306.

* cited by examiner

GRAPH DATABASE FOR SERVICES PLANNING AND CONFIGURATION IN NETWORK SERVICES DOMAIN

TECHNICAL FIELD

The disclosure relates to computer networks and, more specifically, to applying network services to subscriber data traffic traversing computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information.

Network service providers provide services such as security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. To provide these new services, service providers have often turned to specialized, dedicated appliances. In some cases, routers have been modified to include additional hardware or software that applies various services to the incoming packets. For example, line cards installed in a service plane of a router may be configured to perform particular services, such as the services described above.

Deploying services and responding to network events that impact such services may be expensive and time consuming. For instance, manual provisioning of services may require substantial time and human resources to determine whether network resources are available. In the event of a network event, such as a link or device failure, services may need to be manually re-provisioned by determining whether an alternative set of network resources are available. As such, manual provisioning of services may result in higher operational costs because existing techniques often require time-consuming evaluation of multiple resources and the respective capabilities of such resources.

SUMMARY

In general, techniques are described for representing services, network resources, and relationships between such services and resources in a graph database with which to validate, provision, and manage the services in near real-time. Vertexes of the graph database represent services abstractions and network resources, and edges of the graph database represent relationships between the service abstractions and the resources or between the network resources and other network resources. The graph database representation and mapping techniques described herein may be usable by a software-defined networking (SDN) controller to validate and provision requests for networks services more efficiently than other conventional data modeling techniques, as well as to store a near real-time representation of the network topology and service provided in the network. As such, modeling network resources in a graph database enables the SDN controller to fulfill requests for network resources more efficiently than manually validating and provisioning such services.

Techniques of the disclosure leverage the performance of the graph database to improve the fulfillment of requests for services by providing an interface at the SDN controller to receive standard, data-interchange formatted messages that indicate requests for services. In some examples, the interface provides customers that use the network with the flexibility to request and configure services in a cost- and time-effective manner. For instance, in response to receiving a data-interchange formatted message with a request to configure a service, the SDN controller may query the graph database to determine whether a set of network resources is available to fulfill the request. By modeling the network resources and their corresponding relationships in a graph database and providing an interface to receive data-interchange formatted messages that specify requests for network resources, techniques of the disclosure may reduce the amount of manual validation and configuration to fulfill a request for services, thereby reducing the amount of time and effort required to provision services. Furthermore, techniques of the disclosure may update the graph database in real-time in response to network events, such as link and device failures. In response to a network event, the SDN controller may query the graph database to automatically re-provision existing services to use different network resources. As such, techniques of the disclosure may reduce the amount of failover time and manual effort to re-provision services in the event of a failure.

In some examples, a method includes storing a graph database comprising a plurality of vertexes, each respective vertex representing a respective network resource of a plurality of network resources, and the graph database comprising a plurality of edges between a set of the plurality of vertexes, each respective edge indicating a relationship between at least two respective network resources of the plurality of network resources; receiving, at an application programming interface of a software defined network (SDN) controller, a data-interchange formatted message that indicates a service request to configure a network service within a network; querying, at least a portion of the plurality of vertexes and plurality of edges of the graph database based at least in part on the service request, to determine whether a set of the plurality of network resources can satisfy the service request to provision the network service within the network; and responsive to determining that the set of the plurality of network resources can satisfy the service request, configuring, by the SDN controller, the set of the plurality of network resources to provide the network service within the network.

In some examples, a non-transitory computer-readable medium includes instructions that cause at least one processor of a controller device to: store a graph database comprising a plurality of vertexes, each respective vertex representing a respective network resource of a plurality of network resources, and the graph database comprising a plurality of edges between a set of the plurality of vertexes, each respective edge indicating a relationship between at least two respective network resources of the plurality of network resources; receive, at an application programming interface of the controller device, a data-interchange formatted message that indicates a service request to configure a network service within a network; query, at least a portion of the plurality of vertexes and plurality of edges of the graph database based at least in part on the service request, to determine whether a set of the plurality of network resources can satisfy the service request to provision the network service within the network; and responsive to determining that the set of the plurality of network resources can satisfy the service request, configure the set of the plurality of network resources to provide the network service within the network.

In some examples, a controller device includes: at least one processor; at least one memory to store a graph database comprising a plurality of vertexes, each respective vertex representing a respective network resource of a plurality of network resources, and the graph database comprising a plurality of edges between a set of the plurality of vertexes, each respective edge indicating a relationship between at least two respective network resources of the plurality of network resources; a service provisioning module that receives, at an application programming interface of the controller device, a data-interchange formatted message that indicates a service request to configure a network service within a network, wherein the service provisioning module queries, at least a portion of the plurality of vertexes and plurality of edges of the graph database based at least in part on the service request, to determine whether a set of the plurality of network resources can satisfy the service request to provision the network service within the network; and a path provisioning module that, responsive to determining that the set of the plurality of network resources can satisfy the service request, configures the set of the plurality of network resources to provide the network service within the network.

The details of one or more embodiments of this disclosure are set forth in the accompanying drawings and the description below. Other features, objects, and advantages will be apparent from the description and drawings, and from the claims.

DETAILED DESCRIPTION

Figure 1:
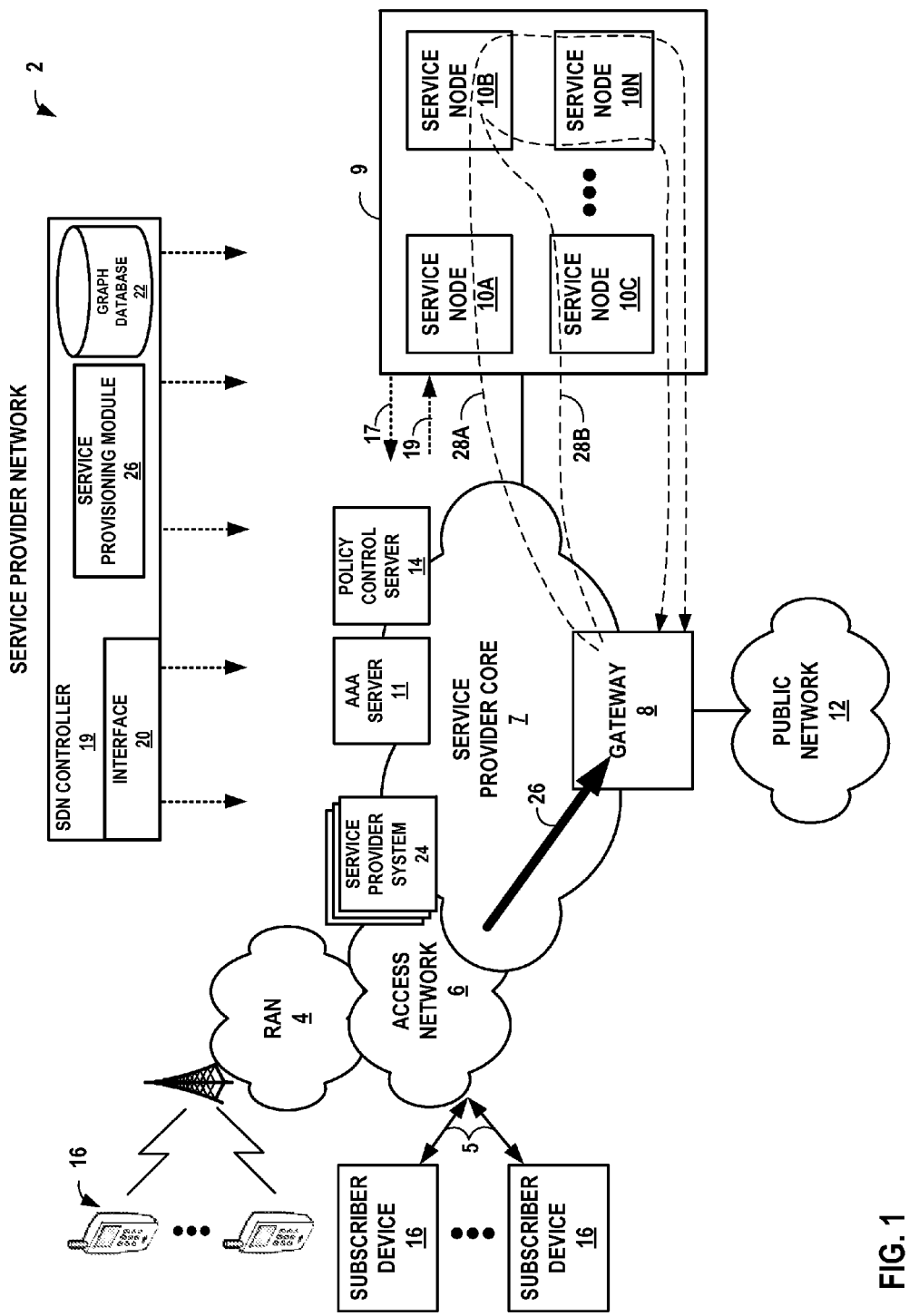
FIG. 1 illustrates an example network system in accordance with techniques described herein.

FIG. 1 illustrates an example network system in accordance with techniques described herein. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with PDN 12, which may be an internal or external packet-based network such as the Internet.

In the example of FIG. 1, service provider network 2 comprises access network 6 ("access network 6") that provides connectivity to packet data network (PDN) 12 via service provider core network 7 and gateway 8. Service provider core network 7 and PDN 12 provide packet-based services that are available for request and use by subscriber devices subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

Service provider core network 7 (hereinafter, "core network 7") offers packet-based connectivity to subscriber devices 16A-16M attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12, and such packets traverse gateway 8 as part of at least one packet flow. Flows 26 illustrated in FIG. 1 represent one or more upstream packet flows from any one or more subscriber devices 16 and directed to PDN 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, service provider network 2 includes a services complex 9 having a cluster of service nodes 10A-10N that provide an execution environment for the network services. That is, each of service nodes 10 apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 10 in this way represents a service instance.

Although illustrated as part of a services complex 9, which may represent a data center, service nodes 10 may, for instance, be coupled by one or more switches or virtual switches of core network 7. In one example, each of service nodes 10 may run as virtual machines in virtual compute environment. Moreover, the compute environment may comprise a scalable cluster of general computing devices, such as x86 processor-based servers. As another example, service nodes 10 may comprises a combination of general purpose computing devices and special purpose appliances. As virtualized, individual network services provided by service nodes 10 can scale just as in a modern data center, through the allocation of virtualized memory, processor utilization, storage and network policies, as well as horizontally by adding additional load-balanced virtual machines.

As shown in FIG. 1, gateway 8 steers individual subscriber packet flows 26 through defined sets of services provided by service nodes 10. That is, each subscriber packet flow may be forwarded through a particular ordered combination of services provided by service nodes 10, each ordered set being referred to herein as a "service chain." In the example of FIG. 1, one or more subscriber packet flows 26 are directed along a first service chain 28A and, therefore, receive services applied by service nodes 10A, 10B and 10N, in that order. Similarly, one or more subscriber packet flows 26 are directed along a second service chain 28B and, therefore, receive services applied by service nodes 10C, 10B and 10N.

In this way, subscriber flows 26 may be processed by service nodes 10 as the packets flow between access network 6 and PDN 12 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N. Accordingly, packet flows 26 processed according to service chain 28A follow a service path that traverses nodes 10A, 10B, and finally node 10N as the terminal node for the service chain 28A. A particular node 10 may support multiple service chains. In this example, service node 10B supports service chains 28A, 28B.

Once processed at a terminal node of the service chain, i.e., the last node 10 to apply services to packets flowing along a particular service path, the terminal node may direct the traffic back to gateway 8 for further processing and/or forwarding to PDN 12. For example, traffic engineered service paths may start and terminate with gateway 8.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. Gateway 8, after authenticating and establishing access sessions for the subscribers, directs packet flows for the subscribers along the appropriate service tunnels, thereby causing service complex 9 to apply the requisite ordered services for the given subscriber.

Nodes 10 may implement service chains 28A, 28B using internally configured forwarding state that directs packets of the packet flow along the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flow to the service nodes 10 according to service chains 28A, 28B.

In FIG. 1, software-defined networking (SDN) controller 19 provides a high-level controller for configuring and managing routing and switching infrastructure of service provider network 2 (e.g., gateway 8, core network 7 and nodes 10). SDN controller 19 may be implemented as software, hardware, or a combination of software and hardware. In some examples, SDN controller 19 may be referred to as a controller device. In some instances, SDN controller 19 manages deployment of virtual machines within the operating environment of value-added services complex 9. For example, SDN controller 19 may interact with gateway 8 to specify service chain 28A, 28B information. For example, the service chain information provided by SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller are described in PCT International Patent Application PCT/US13/44378, filed Jun. 5, 2013, the entire contents of which are incorporated herein by reference.

Service provider network 2 may include an Authentication, Authorization and Accounting server 11 ("AAA server 11). For example, upon detecting a new traffic flow, gateway 8 may authenticate new subscribers to AAA server 11, e.g., by way of the Radius or Diameter protocols, and, at this time, receive a service profile or other information that defines the services to be applied to the subscriber or maps the various traffic expected for the subscriber to one or more service flows. Upon detecting a new flow, the gateway 8 selects the service chain for the flow based on the service profile and traffic type. For example, gateway 8 selects one of the service chains for the packet based on the service profile received for the subscriber and/or based on the type of traffic, e.g., HTTP traffic or VoIP traffic.

Service nodes 10 may receive subscriber-specific service requirements from other elements of service provider network, such as SDN controller 19, AAA server 11, policy control server 14 or other subscriber control systems to configure the services chains. For example, when processing packet flows, service nodes 10 may issue receive subscriber-specific service requirements. Examples of subscriber-specific service requirements returned by SDN controller 19 or AAA server 11 include policies, service level agreement parameters, information describing the services to be applied for a particular subscriber, and the like.

As a specific example, one or more of service nodes 10 may implement policy and charging control (PCC) functionality for subscriber devices 16. In response to queries issued by any of service nodes 10, policy control server 14 issues responses to provision the requesting service node by a policy interface with one or more policy rules that each specifies a set of information enabling the detection of a service data flow and defining policy control, charging, or application detection parameters for application by network elements of access network 6. Policy control server 14 may provision one or more service nodes 10 with a Policy Control and Charging Rules Function (PCRF) for a mobile (e.g., 3GPP) subscriber devices or, alternatively or in addition, for a broadband/wireline subscriber devices.

One or more of service nodes 10 may, for example, provide an operating environment for a policy enforcement module that enforces subscriber-based policy and charging control according to the policy rules. In some examples, the policy interface presented by a service node 10 may represent a Gx and/or Sd interface/reference point provided by one or more service nodes. In some instances, the policy rules provided by policy control server 14 to gateway 8 include PCC rules and the policy enforcement module(s) executing on service nodes 10 represents a Policy and Charging Enforcement Function (PCEF). In some instances, the policy rules may also or alternatively include Application Detection and Control (ADC) rules and the policy enforcement module implemented by one or more service nodes may represents a Traffic Detection Function (TDF). In some instances, the policy enforcement module(s) of service nodes 10 may represent a Policy Decision Point for a BPCF framework. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; and 3GPP TS 29.212—Policy and Charging Control (PCC), Reference Points (Release 11)," Version 11.7.0, February 2012; which are each incorporated herein by reference in their entirety.

In accordance with techniques of the disclosure, service provider network 2 may include a service provider system 24. In general, service provider system 24 may send requests to SDN controller 19 that cause SDN controller 19 to validate, provision, and/or manage services provided by service provider network 2. As further described in this disclosure, service provider system 24 may send data-interchange formatted messages to interface 20 of SDN controller 19 that include requests to validate, provision, and/or manage services provided by service provider network 2. Service provider system 24 may be implemented as hardware, software, and/or a combination of hardware and software. Although shown as a standalone system in FIG. 1, any set of functionality of service provider system 24 described in this disclosure may be implemented in SDN controller 19, gateway 8, AAA server 11, policy control server 14, or any other suitable device.

In the example of FIG. 1, service provider system 24 is implemented and operated by the service provider that manages service provider network 2. In such examples, customers of the service provider may interact with service provider system 24 using a client device (not shown). For instance, service provider system 24 may provide a portal that includes a graphical user interface and/or application programming interface (API), which allow customers to submit requests for network services. Examples of customers may include universities, businesses, non-profits, individual persons, or any other entities that purchase or otherwise use services provided by service provider network 2. In other examples, service provider system 24 may be owned, operated, and/or maintained by the customer rather than the service provider that manages service provider network 2.

Service provider system 24 may send data-interchange formatted messages to interface 20 of SDN controller 19 to request network services. In some examples, interface 20 is implemented according to a stateless, client-server communications architecture. The stateless, client-server communications architecture may rely on a protocol that is cacheable. As an example, interface 20 may be implemented according to a representational state transfer (REST) software architecture to send and receive data-interchange formatted messages with service provider system 24. Data-interface formatted messages may conform to an open standards format that uses human-readable text to transmit data objects that include attribute-value pairs. An example of a data-interface formatted message format is JavaScript Object Notation (JSON), described in RFC 7159 and ECMA-404.

To submit requests to SDN controller 19, service provider system 24 may generate data-interface formatted messages that include service abstractions. A service abstraction may include a definition of one or more services and/or resources of a network requested by a customer. As one example, a service abstraction may specify a Virtual Private Network (VPN) service requested by a customer between one or more customer sites. Service provider system 24 may structure the service abstraction in a data-interface formatted message according to one or more schemas that define the requirements for the structure, content, and/or semantics of the data-interface formatted message. In some examples, SDN controller 19 may store and provide the schemes for interface 20, which may be retrieved by service provider system 24. In other examples, service provider system 24 may receive the schemas from sources other than SDN controller 19.

An example of a service abstraction specified in a data-interface formatted message may include the following:

```
{
    "service_name" : "citi_l3vpn",
    "service_type" : "l3vpn",
    "customer" : "citi",
    "sites" : [
        "SFO",
        "LAX",
        "NYC",
        "DFW"
    ],
    "topology" : "full-mesh",
    "qos_profile" : "gold"
}
```

The attributes "service_name", "service_type", "customer", "sites", "topology" and "qos_profile" attributes together with the corresponding values collectively define a request to configure a full mesh VPN with a Gold quality of service profile between customer sites SFO, LAX, NYC, and DFW. The above service abstraction conforms to a schema described at the end of this disclosure.

In response to input provided by a customer to request a service, service provider system 24 may generate a data-interface formatted message that includes a service abstraction defining the service, such as described for the VPN service above. Service provider system 24 sends the data-interface formatted message to interface 20. Interface 20 may be implemented by service provisioning module 26. In some examples, service provisioning module 26 may also provide logic to perform the following operations including but not limited to: receiving requests, validating requests, querying graph database 22, updating graph database 22 information about the network, determining the occurrence of network events (e.g., link and device failures), reserving resources, and simulating the provisioning of services.

Figure 5:
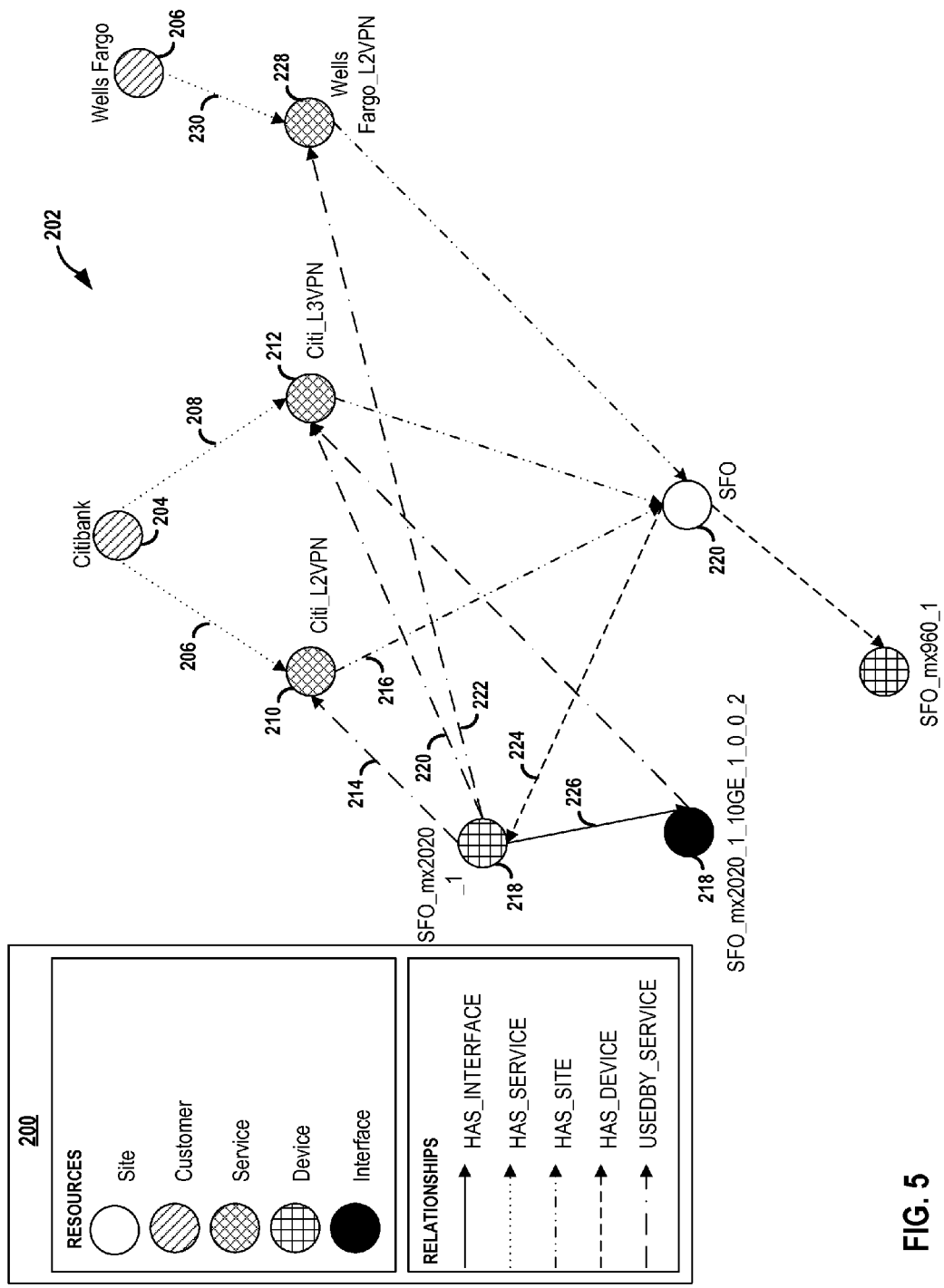
FIG. 5 is a conceptual diagram of a graph included in a graph database that models network resources and services in a network, in accordance with techniques of this disclosure.

As shown in FIG. 1, SDN controller 19 includes graph database 22. Graph database 22 models service abstractions, network resources, and relationships between such network resources, as one or more graphs. Graph database 22 may include one or more vertexes, wherein each respective vertex represents a respective network resource. In some examples, graph database 22 may include one or more edges between vertexes, wherein each respective edge indicates a relationship between at least two respective network resources. Examples of network resources may include any elements of a network including but not limited to: customer sites, customers, services, network devices, and interfaces. Relationships may specify logical relations between network resources. For instance, a relationship between two vertexes may indicate a network device "HAS" an interface, or that network device is used by a VPN service. FIG. 5 illustrates further details of relationships between network resources.

As described above, service provisioning module 26 may determine service and topology characteristics of service provider network 7 and model the corresponding resources and relationships in graph database 22. Service provisioning module 26 may populate graph database 22 with the information indicating services, topology, resources, and relationships at initial configuration and startup, as further described in FIG. 4. As service provisioning module 26 receives requests via interface 20 and changes one or more configurations, service provisioning module 26 may update graph database 22 to indicate the changes. In some examples, in response to network events, such as link and/or device failures, service provisioning module 26 updates graph database 22 to reflect the current state of the network.

Service provisioning module 26, interface 20, and graph database 22 provide a flexible service abstraction layer on top of SDN controller 19 that can support fast-changing service types, adapt to real time network resources, and enforce business logic. As such, service provisioning module 26, interface 20, and graph database 22 may facilitate and accelerate the validation of service requests, the determination of resource availability for requested services, the allocation and reservation of resources, and the failover of one set of resources to another in response to a network event.

In operation, a customer may wish to establish a service within service provider core 7, such as a VPN service. The customer may interact with a portal provided by service provider system 24 to generate a service request for the VPN service. A service request, generally, includes data that defines a request for one or more particular services. For instance, the customer may specify one or more resources to configure the VPN service including but not limited to: an identifier or name of the VPN service, a type of service (e.g., VPN), an identifier or name of the customer, the sites between which the VPN service will be established, the topology type for the VPN service, and a QOS level of service. Service provider system 24 generates a data-interface formatted message (e.g., a JSON message) with a service request to configure the VPN service that includes a service abstraction defining the VPN service. Service provider system 24 sends the message to SDN controller 19.

SDN controller 19 receives the data-interface formatted message at interface 20 provided by service provisioning module 26. Service provisioning modules may preliminarily validate the data-interface formatted message against one or more schemas as further described in FIG. 6. If the data-interface formatted message does not conform to the schema, service provisioning module 26 may send a response to service provider system 24 indicating that the data-interface formatted message format is invalid. If, however, the data-interface formatted message does conform to the schema, service provisioning module 26 may query, at least a portion of the vertexes and edges of graph database 22 based at least in part on the service request of the data-interface formatted message, to determine whether a set network resources can satisfy the service request to provision the VPN service within the network.

Based on the query, service provisioning module 26 may determine whether a set of network resources can satisfy the service request for the VPN service. If service provisioning module 26 determines, based on the query of graph database 22, that the service request cannot be satisfied, service provisioning module 26 may send a response to service provider system 24 that the service request cannot be satisfied. If the service request can be satisfied, service provisioning module 26 may cause one or more components (not shown) of SDN controller to configure a set of network resources to provide the VPN service within the network, as further described in FIGS. 3-4. For instance, when SDN controller 10 maps network resources to a specific service, such as the VPN service, they may be reserved. Once SDN controller 19 deploys the SDN service, the network resources may be taken out of the available resources pool because they are in use as part of the VPN service.

As described above, techniques of the disclosure implement an abstracted network service wherein current network resources can be modeled in a graph database and queried, which may reduce the need to implement business logic in a hard-coded program, which may be flexible and/or difficult to maintain. Moreover, the flexible service abstraction layer on top of SDN controller 19 provided by service provisioning module 26, interface 20, and graph database 22 provide for service abstraction validation and mapping to network resource data model in real-time, such that SDN controller 19 can react to real-time network events and provide real-time control and analytics insights of the network. Consequently, techniques of the disclosure may improve the ability of a service provider to provide network services agility to end-users.

Figure 2:
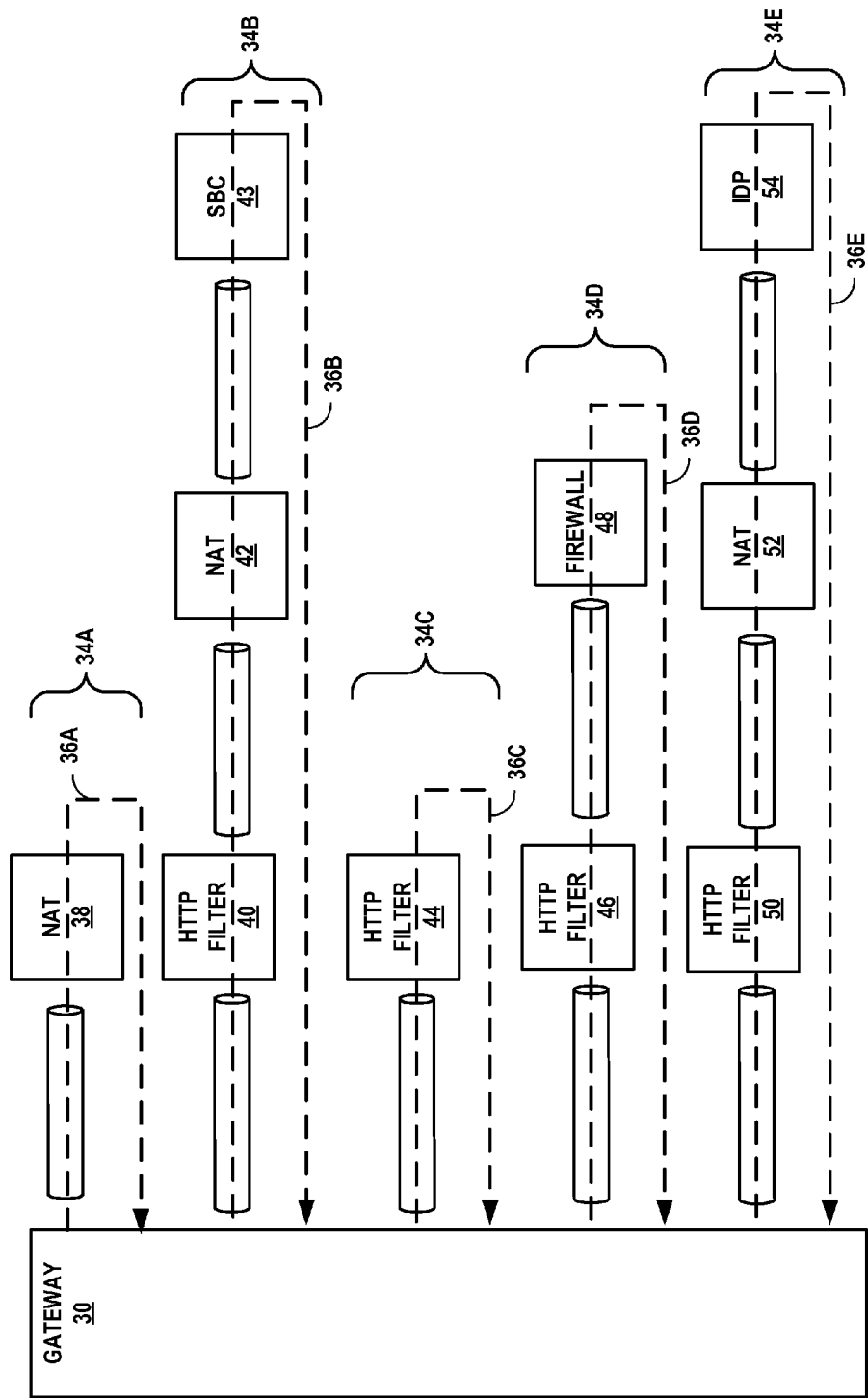
FIG. 2 is a block diagram illustrating an example set of service chains supported by an example controller, in accordance with techniques of the disclosure.

FIG. 2 is a block diagram illustrating an example set of service chains supported by an example controller, in accordance with techniques of the disclosure. In particular, FIG. 2 illustrates a set of service chains 34A-34E supported by gateway 30. Gateway 30 may, in one example, represent gateway 8 of FIG. 1 such that service chains 34 represent an example set of service chains 28 provided by service nodes 10.

In this example, one or more subscriber packet flows 36A are directed along a first service chain 34A to receive network address translation (NAT) service 38. Similarly, one or more subscriber packet flows 36B are directed along a second service chain 34B for application of an HTTP filter service 40, NAT service 42 and session border controller (SBC) services 43 for voice over IP (VoIP) processing and control. In service chain 34C, packet flows 36C are directed only to HTTP filter service 44. In service chain 34D, packet flows 36D are directed to HTTP filter 46 and subsequently to firewall service 48. As another example, packet flows 36E are directed along service chain 34E for application of HTTP filter 50, NAT 52 and intrusion detection and prevention (e.g., deep packet inspection) service 54.

In accordance with techniques of the disclosure, service provisioning module 26 may maintaining a graph database comprising a plurality of vertexes, each respective vertex representing a respective network resource of a plurality of network resources. The graph database may also include a plurality of edges between a set of the plurality of vertexes, each respective edge indicating a relationship between at least two respective network resources of the plurality of network resources. Each of service chains 34A-34E may provide one or more services. Service provisioning module 26 may model the resources and relationships between the resources that provide the services in graph database 22, as further described in FIGS. 3-6.

In the example of FIG. 2, a customer may wish to have an HTTP filter applied to one a packet flow. The customer may provide information at service provider system 24 to define the requested HTTP filter for packet flow 36C. Service provider system 24 may generate a service abstraction that includes a definition of an HTTP filter service requested by a customer. Service provider system 24 sends the service abstraction in a data interchange-formatted message, such as JSON, to service provisioning module 26.

Service provisioning module 26 receives, at a REST interface, the data-interchange formatted message that indicates a service request to configure a network service within a network. Upon receiving the message, service provisioning module 26 queries, at least a portion of the plurality of vertexes and plurality of edges of graph database 22 based at least in part on the service request, to determine whether a set of the plurality of network resources represented in the graph of graph database 22 can satisfy the service request to provision the HTTP filter service within the network. In the example of FIG. 2, service provisioning module 26 determines, based on querying graph database 22, that sufficient resource exist in the network to provision the HTTP filter service.

Responsive to determining, using graph database 22, that a set of the plurality of network resources can satisfy the service request, service provisioning module configure one or more of service nodes 10 to provide service chain 34C. Service chain 34C provides HTTP filter 44 on packet flow 36C. In this way, customers may send service requests to service provisioning module 26 using the REST interface and standards based JSON formatted messages. Service provision module 26 may configure service nodes automatically to provision service chains based on the message. As such, techniques of the disclosure may more efficiently facilitate the provision of services in the network and with limited and/or no manual effort required by administrators to configure the network service after the service provider system 24 sends the message with the initial service request.

Figure 3:
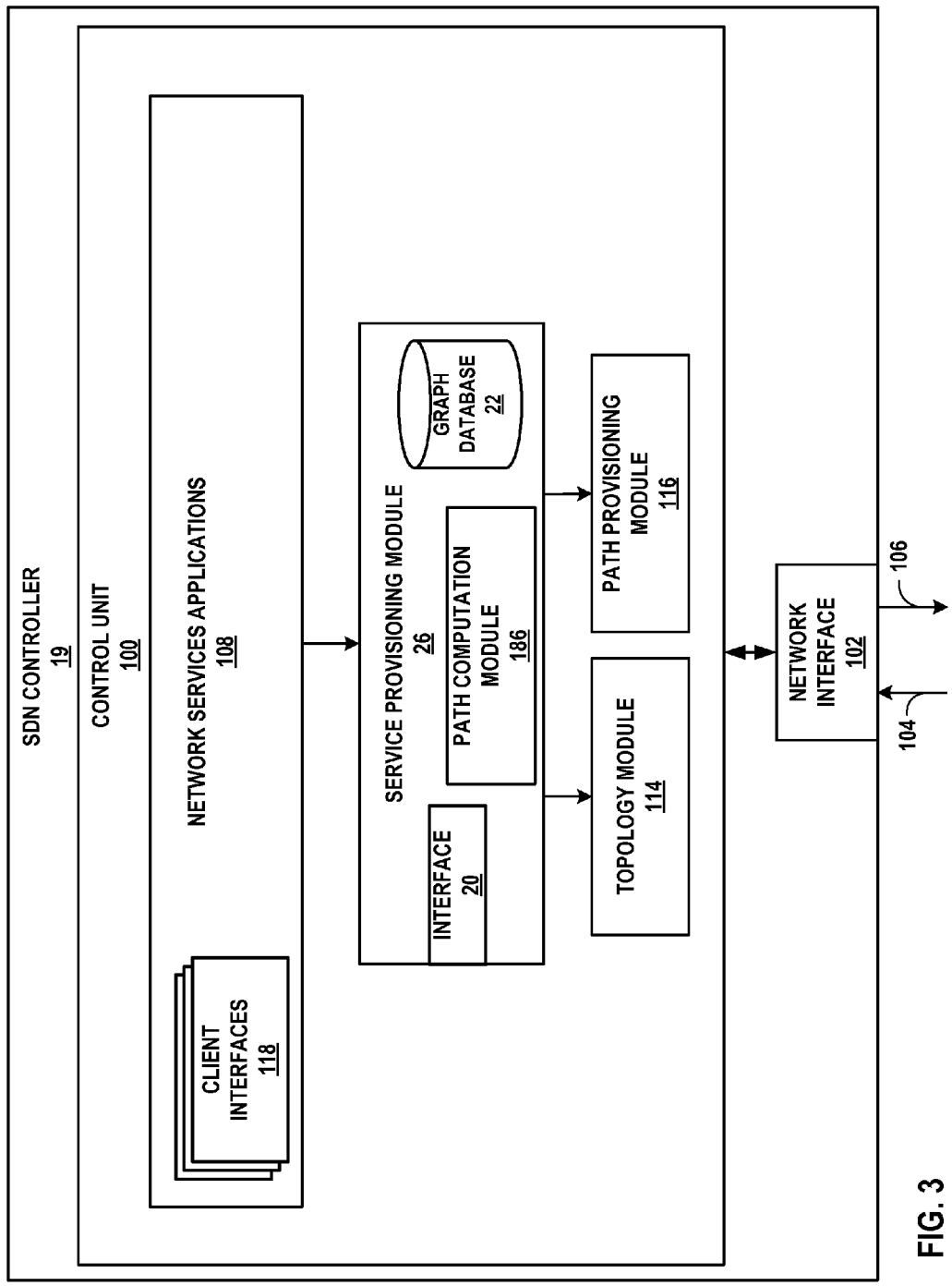
FIG. 3 is a block diagram illustrating an example controller that receives path requests, computes and schedules paths that satisfy the path requests, and establishes requested paths in a path computation domain according to techniques described herein.

FIG. 3 is a block diagram illustrating an example controller that receives path requests, computes and schedules paths that satisfy the path requests, and establishes requested paths in a path computation domain according to techniques described herein. SDN controller 19 may include a server or network controller, for example, and may represent an example instance of SDN controller 19 of FIG. 2.

SDN controller 19 includes a control unit 100 coupled to a network interface 102 to exchange packets with other network devices by inbound link 104 and outbound link 106. Control unit 100 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 100 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 100 provides an operating environment for network services applications 108, service provisioning module 26, topology module 164, and path provisioning module 174. In one example, these modules may be implemented as one or more processes executing on one or more virtual machines of one or more servers. That is, while generally illustrated and described as executing on a single SDN controller 19, aspects of these modules may be delegated to other computing devices.

Network services applications 108 represent one or more processes that provide services to clients of a service provider network that includes SDN controller 19. Network services applications 108 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 108 require services provided by service provisioning module 26, such as node management, session management, and policy enforcement.

Each of network services applications 108 may include respective client interfaces 118 by which one or more client applications request services. Client interfaces 118 may represent a command line interface (CLI) or graphical user interface (GUI), for instance. Client interfaces 118 may also, or alternatively, provide an application programming interface (API) such as a web service to client applications. Service provisioning module 26 may also provide interface 20, as described in FIG. 1. As described in FIG. 1, interface 20 may be an application programming interface (API) implemented with a REST web service.

Network services applications 108 issue path requests to service provisioning module 26 to request paths in a path computation domain controlled by SDN controller 19. In general, a path request includes a required bandwidth or other constraint and two endpoints representing an access node and an edge node that communicate over the path computation domain managed by SDN controller 19. Path requests may further specify time/date during which paths must be operational and CoS parameters (for instance, bandwidth required per class for certain paths).

Service provisioning module 26 accepts path requests from network services applications 108 to establish paths between the endpoints over the path computation domain. Paths may be requested for different times and dates and with disparate bandwidth requirements. Service provisioning module 26 reconciles path requests from network services applications 108 to multiplex requested paths onto the path computation domain based on requested path parameters and anticipated network resource availability.

To intelligently compute and establish paths through the path computation domain, service provisioning module 26 includes topology module 164 to receive topology information describing available resources of the path computation domain, including access, aggregation, and edge nodes, interfaces thereof, and interconnecting communication links.

Service provisioning module 26 includes a path computation module 186 (further shown in FIG. 4) that computes requested paths through the path computation domain. In general, paths are unidirectional. Upon computing paths, path computation module 186 schedules the paths for provisioning by path provisioning module 174. A computed path includes path information usable by path provisioning module 174 to establish the path in the network. Provisioning a path may require path validation prior to committing the path to provide for packet transport.

Figure 4:
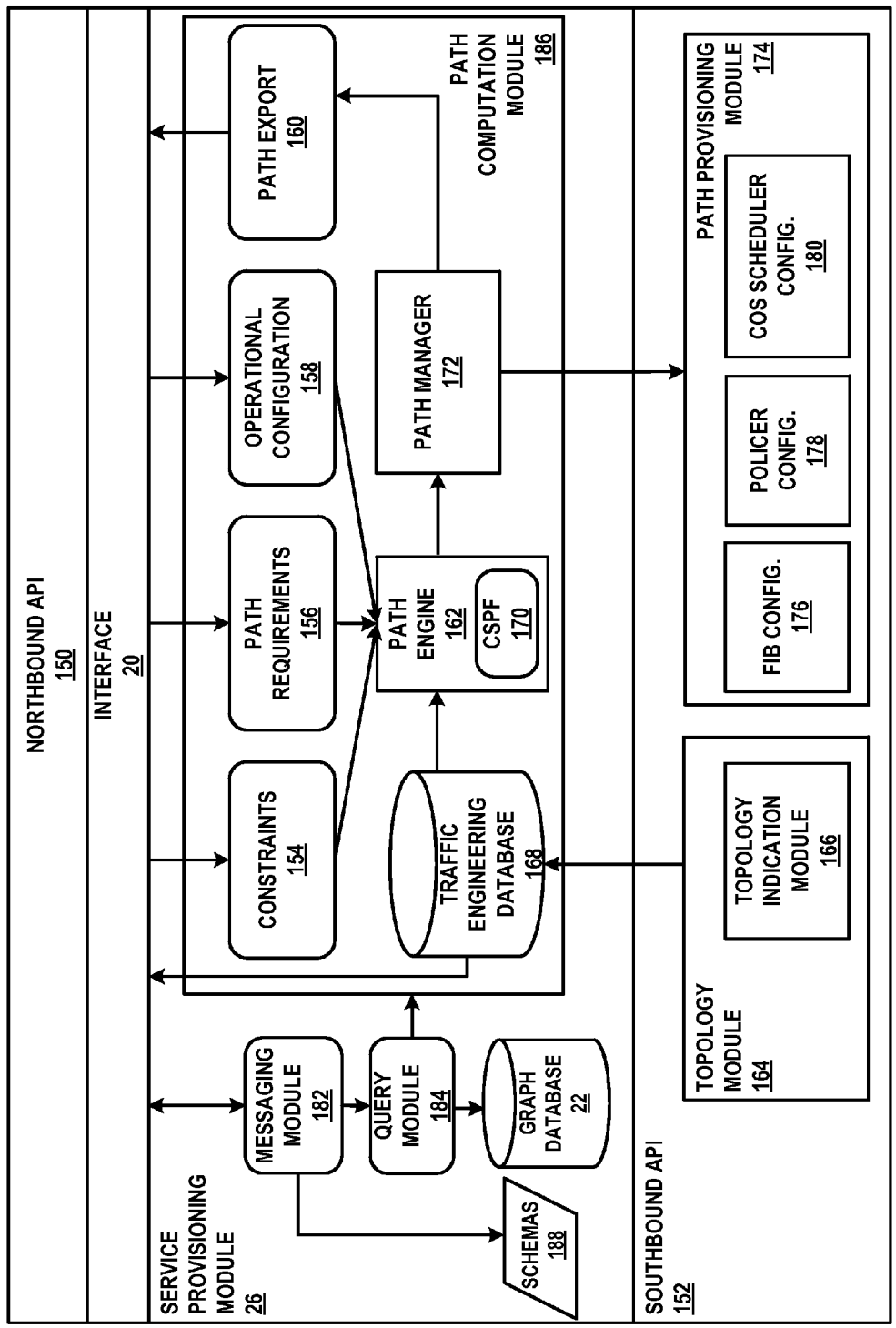
FIG. 4 is a block diagram illustrating, in detail an example implementation of service provisioning module of FIG. 3, in accordance with techniques of the this disclosure.

FIG. 4 is a block diagram illustrating, in detail an example implementation of service provisioning module 26 of SDN controller 19 of FIG. 3, in accordance with techniques of the this disclosure. In this example, service provisioning module 26 includes northbound and southbound interfaces in the form of northbound application programming interface (API) 150 and southbound API (152). Northbound API 150 includes methods and/or accessible data structures by which network services applications 108 may configure and request path computation and query established paths within the path computation domain. Southbound API 152 includes methods and/or accessible data structures by which service provisioning module 26 receives topology information for the path computation domain and establishes paths by accessing and programming data planes of aggregation nodes and/or access nodes within the path computation domain.

Path computation module 186 includes data structures to store path information for computing and establishing requested paths. These data structures include constraints 154, path requirements 156, operational configuration 158, and path export 168. Network services applications 108 may invoke northbound API 150 to install/query data from these data structures. Constraints 154 represent a data structure that describes external constraints upon path computation. Constraints 154 allow network services applications 108 to, e.g., modify link attributes before path computation module 214 computes a set of paths. For examples, Radio Frequency (RF) modules (not shown) may edit links to indicate that resources are shared between a group and resources must be allocated accordingly. Network services applications 108 may modify attributes of link to effect resulting traffic engineering computations. In such instances, link attributes may override attributes received from topology indication module 166 and remain in effect for the duration of the node/attendant port in the topology. A link edit message to constraints 154 may include a link descriptor specifying a node identifier and port index, together with link attributes specifying a bandwidth, expected time to transmit, shared link group, and fate shared group, for instance.

Path export 160 represents an interface that stores path descriptors for all paths currently committed or established in the path computation domain. In response to queries received via northbound API 150, path export 160 returns one or more path descriptors. Queries received may request paths between any two edge and access nodes terminating the path(s). Path descriptors may be used by network services applications 108 to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value; and, for each node in the ordered path from ingress to egress, a node identifier, ingress label, and egress label.

Path requirements 156 represent an interface that receives path requests for paths to be computed by path computation module 116 and provides these path requests (including path requirements) to path engine 162 for computation. A path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 164 includes topology indication module 166 to handle topology discovery and, where needed, to maintain control channels between service provisioning module 26 and nodes of the path computation domain. Topology indication module 166 may include an interface to describe received topologies to path computation module 186.

Topology indication module 166 may use a topology discovery protocol to describe the path computation domain topology to path computation module 186. Using topology discovery, topology indication module 166 may receive a list of node neighbors, with each neighbor including a node identifier, local port index, and remote port index, as well as a list of link attributes each specifying a port index, bandwidth, expected time to transmit, shared link group, and fate shared group, for instance.

In some examples, topology module 164 may populate graph database 22 with topology information about the service provider network, such as network resources and relationships between network resources. In some examples, service provisioning module 26 may use data from other data sources as well to populate graph database 22. For instance, service provisioning module 26 may access one or more customer databases that include information about customers, sites, and services provided to the customers. Service provisioning module 26 may also use data from path provisioning module 174 that indicates state information about network devices and interfaces of network devices, including service nodes 10. Service provisioning module 26, when populating graph database 22, may automatically identify network resources and generate vertexes in graph database 22 for each network resource. Service provisioning module 26, when populating graph database 22, may automatically identify relationships between network resources and generate edges between vertexes in graph database 22 for each relationship between two or more network resources.

Topology indication module 166 may communicate with a topology server, such as a routing protocol route reflector, to receive topology information for a network layer of the network. Topology indication module 166 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 166 may in some instances be a passive listener that neither forwards nor originates routing protocol advertisements. In some instances, topology indication module 166 may alternatively, or additionally, execute a topology discovery mechanism such as an interface for an Application-Layer Traffic Optimization (ALTO) service. Topology indication module 166 may therefore receive a digest of topology information collected by a topology server, e.g., an ALTO server, rather than executing a routing protocol to receive routing protocol advertisements directly.

In some examples, topology indication module 166 receives topology information that includes traffic engineering (TE) information. Topology indication module 166 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology indication module 166 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 168 stores topology information, received by topology indication module 166, for a network that constitutes a path computation domain for SDN controller 19 to a computer-readable storage medium (not shown). TED 168 may include one or more link-state databases (LSDBs), where link and node data is received in routing protocol advertisements, received from a topology server, and/or discovered by link-layer entities such as an overlay controller and then provided to topology indication module 166. In some instances, an operator may configure traffic engineering or other topology information within MT TED 168 via a client interface.

Path engine 162 accepts the current topology snapshot of the path computation domain in the form of TED 168 and computes, using TED 168, CoS-aware traffic-engineered paths between nodes as indicated by configured node-specific policy (constraints 114) and/or through dynamic networking with external modules via APIs. Path engine 162 may further compute detours for all primary paths on a per-CoS basis according to configured failover and capacity requirements (as specified in operational configuration 158 and path requirements 156, respectively).

In general, to compute a requested path, path engine 162 determines based on TED 168 and all specified constraints whether there exists a path in the layer that satisfies the TE specifications for the requested path for the duration of the requested time. Path engine 162 may use the Djikstra constrained SPF (CSPF) 170 path computation algorithms for identifying satisfactory paths though the path computation domain. If a satisfactory computed path for the requested path exists, path engine 162 provides a path descriptor for the computed path to path manager 172 to establish the path using path provisioning module 174. A path computed by path engine 162 may be referred to as a "computed" path, until such time as path provisioning module 174 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 172 establishes computed scheduled paths using path provisioning module 174, which in this instance includes forwarding information base (FIB) configuration module 176 (illustrated as "FIB CONFIG. 176"), policer configuration module 178 (illustrated as "POLICER CONFIG. 178"), and CoS scheduler configuration module 180 (illustrated as "COS SCHEDULER CONFIG. 180").

FIB configuration module 176 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 176 may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 176 may in addition, or alternatively, implement other interface types, such as a Simple Network Management Protocol (SNMP) interface, path computation element protocol (PCEP) interface, a Device Management Interface (DMI), a CLI, Interface to the Routing System (IRS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding IRS are found in "Interface to the Routing System Framework," Network Working Group, Internet-draft, Jul. 30, 21012, which is incorporated by reference as if fully set forth herein.

FIB configuration module 176 may add, change (i.e., implicit add), or delete forwarding table entries in accordance with information received from path computation module 186. A FIB configuration message from path computation module 186 to FIB configuration module 176 may specify an event type (add or delete); a node identifier; a path identifier; one or more forwarding table entries each including an ingress port index, ingress label, egress port index, and egress label; and a detour path specifying a path identifier and CoS mode.

Policer configuration module 178 may be invoked by path computation module 186 to request a policer be installed on a particular aggregation node or access node for a particular LSP ingress. As noted above, the FIBs for aggregation nodes or access nodes include policers at LSP ingress. Policer configuration module 178 may receive policer configuration requests according to CCP. A CCP policer configuration request message may specify an event type (add, change, or delete); a node identifier; an LSP identifier; and, for each class of service, a list of policer information including CoS value, maximum bandwidth, burst, and drop/remark. FIB configuration module 176 configures the policers in accordance with the policer configuration requests.

CoS scheduler configuration module 180 may be invoked by path computation module 186 to request configuration of CoS scheduler on the aggregation nodes or access nodes. CoS scheduler configuration module 180 may receive the CoS scheduler configuration information. A scheduling configuration request message may specify an event type (change); a node identifier; a port identity value (port index); and configuration information specifying bandwidth, queue depth, and scheduling discipline, for instance.

In accordance with techniques of the disclosure, a customer may wish to configure a service in a service provider network. The customer may interact with service provider system 24 to provide one or more parameters that define the service requested by the customer. Service provider system 24 generates a data-interchange formatted message that includes a service abstraction as described in FIG. 1. The service abstraction may include a definition of the service requested by the customer, including attribute:value pairs that correspond to parameters provided by the user to request the service. Service provider system 24 sends the data-interchange formatted message to SDN controller 19.

SDN controller 19 may initially receive the data-interchange formatted message with interface 20 at northbound API 150. Messaging module 182 of service provisioning module 26 may initially validate the data-interchange formatted message against one or more schemas 188. If the data-interchange formatted message is not valid, messaging module may reject the service request by sending a message (e.g., an HTTP error code) to service provider system 24 using interface 20. If, however, the data-interchange formatted message is valid, messaging module 182 sends information from the data-interchange formatted message to query module 184. Query module 184 may generate a query to perform on graph database 22. To generate the query, service provisioning module may determine a service abstraction included in the data-interchange formatted message, wherein the service abstraction includes a plurality of parameters that define the service request. Query module 184 may translate, based at least in part on the parameters, the service request into a query usable to determine whether the set of the plurality of network resources satisfies the service request. Query module 184 may traverse one or more edges of graph database 22 in accordance with the query to determine whether the vertexes and relationships between the vertexes satisfy the query. Specifically, query module 184, when traversing graph database 22, evaluates the relationships between the resources represented by the vertexes to determine whether the relationships satisfy conditions of the query. In other words, query module 184 may determine, based at least in part on the query, that the set of the plurality of network resources satisfies the service request.

Query module 184, based on the query, determines whether resources are available to provide the requested service. If sufficient resources are not available to fulfill the request, query module 184 may send data to messaging module 182 indicating insufficient resources are available. Messaging module 182 may send a response to service provider system 24 that rejects the service request. In some examples, messaging module 182 rejects the service request by sending an HTTP error code (e.g., HTTP error code 403) via interface 20 to service provider system 24.

If sufficient resources are available to fulfill the request, query module 184 may send data to path computation module 186 to provision the network service using one or more service nodes 10. Data to provision the network service that is sent by query module 184 to path computation module 186 may include, but are not limited to, network resources and corresponding relationships identified in graph database 22, constraints 154, path requirements 156, and operational configuration 158. Upon receiving the data to provision the network service, path engine 162 obtains a current topology snapshot of the path computation domain in the form of TED 168 and computes, using TED 168, CoS-aware traffic-engineered paths between service nodes 10 as indicated by configured node-specific policy (constraints 114) and/or through dynamic networking with external modules via APIs, as described in more detail above with respect to path engine 162.

If a satisfactory computed path for the requested path exists, path engine 162 provides a path descriptor for the computed path to path manager 172 to establish the path using path provisioning module 174. To configure the network resources indicated by query module 184, path engine manager 172 establishes computed scheduled paths using path provisioning module 174. FIB configuration module 176 programs forwarding information to data planes of aggregation nodes or access nodes of the path computation domain. FIB configuration module 176 may add, change (i.e., implicit add), or delete forwarding table entries in accordance with information received from path computation module 186. In some examples, policer configuration module 178 may be invoked by path computation module 186 to request a policer be installed on a particular aggregation node or access node for a particular LSP ingress. In some examples, CoS scheduler configuration module 180 may be invoked by path computation module 186 to request configuration of CoS scheduler on the aggregation nodes or access nodes.

Path provisioning module 174 may generate and/or compile resource models that are provided in a standard modeling language to set the parameters of service nodes 10. In some examples, path provisioning module 174 may generate and/or compile resource models using the YANG data modeling language, published as RFC 6020. As described with respect to FIG. 4 and further in FIG. 6, YANG provides a standard modeling language to set the parameters of network equipment managed by SDN controller 19. YANG may be used to model the state of network elements and configuration data. In the example of FIG. 4, path provisioning module 174 compiles any resource models needed to provision the network service into one or more modeling files according to the YANG standard.

Upon compiling the one or more modeling files, path provisioning module 174 may execute service provisioning jobs to determine the contents of the one or more data modeling files and provision the requested service. Path provisioning module 174 may translate the YANG-standard formatted message to device-specific configuration information. Path provisioning module 174 then configures one or more service nodes, which correspond to the device-specific configuration information. In this way, service provisioning module 26 changes the states of one or more service nodes to provision the service.

FIG. 5 is a conceptual diagram of a graph included in a graph database that models network resources and services in a network, in accordance with techniques of this disclosure. Specifically, graph database 22 as described in this disclosure may include graph 202. Graph 202 includes multiple vertexes representing network resources and multiple edges representing relationships between the resources. Each vertex and each edge may include one or more attributes that are descriptive of the respective vertex or edge. For instance, a vertex representing a network device may include but is not limited to attributes, such as a unique identifier of the device, a model of the device, one or more capabilities of the device, one or more other components included in the device, to name only a few examples. As another example, an edge representing a relationship between two resources may include but is not limited to attributes such as direct pointers to the vertexes that are connected by the edge and the type of relationship represented by the edge, to name only a few examples. Legend 200 of FIG. 5 illustrates example resources and relationships between the resources. Example resources in legend 200 include, but are not limited to: sites, customers, services, devices, and interfaces. A site may be logical representation of a location or locale that includes, for example, one or more computing devices, one or more network devices, one or more networks, one or more datacenters to name a few examples. A site may represent a building or a collection of buildings, and in some examples, the building or collection of buildings may correspond to a common entity.

Graph 202 may also include vertexes representing customers as resources. A customer may be an entity that pays for and or requests services from the service provider. Examples of customers may includes businesses, universities, non-profits, individual persons, or any other entity. Services may also be represented as resources in graph 202, as illustrated in legend 200. Services may include any service based on or applied to one or more network packets forwarded in the service provider network. Example services may perform security, accounting, traffic shaping operations to name a few. Example services may include but are not limited to VPN, HTTP filter service, NAT service, and session border controller services for voice over IP (VoIP) processing to name a few.

Graph 202 may include vertexes representing devices as resources. Devices may include but are not limited to switches, routers, hubs, security appliances, server devices, desktop computing devices, portable computing devices (e.g., tablets, smartphones, laptops, and the like), and groups of two or more such computing devices. Graph 202 may also include vertexes representing interfaces as resources. An interface may be a physical or logical component that connects a device to a network.

As described above, graph 202 may include one or more edges between vertexes, wherein each edge represents a relationship between two or more vertexes. Legend 200 illustrates a group of example relationships, each having a different type, including but not limited to HAS_INTERFACE, HAS_SERVICE, HAS_SITE, HAS_DEVICE, and USEDBY_SERVICE, to name only a few examples. The example relationships are illustrative and any other relationships between resources may be represented by edges in graph 202. The HAS_INTERFACE relationship indicates that a particular resource (e.g., a device) has an interface. The HAS_SERVICE relationship indicates that a resource (e.g., a customer) has a particular service (e.g., VPN). The HAS_SITE relationship indicates that a resource (e.g., a service) has a particular site. The HAS_DEVICE relationship indicates that a resource (e.g., a site) has a particular device (e.g., a router). The USEDBY_SERVICE relationship indicates that a resource (e.g., interface, device) is used by a particular service (e.g., VPN).

To illustrate the techniques of the disclosure, a description follows herein with respect to graph 202 of FIG. 5 for establishing a layer 2 ("L2") VPN service between customer "Citibank" and customer "Well Fargo". Initially, service provisioning module 26 receives a JSON message from service provider system 24. The JSON message may include a service abstraction that defines a service request for the L2 VPN service. The service abstraction may specify the following information, but is not limited to: customer "Citibank", customer "Wells Fargo", the type of service (e.g., L2 VPN service), and an identifier or name to assign to the service.

Figure 6:
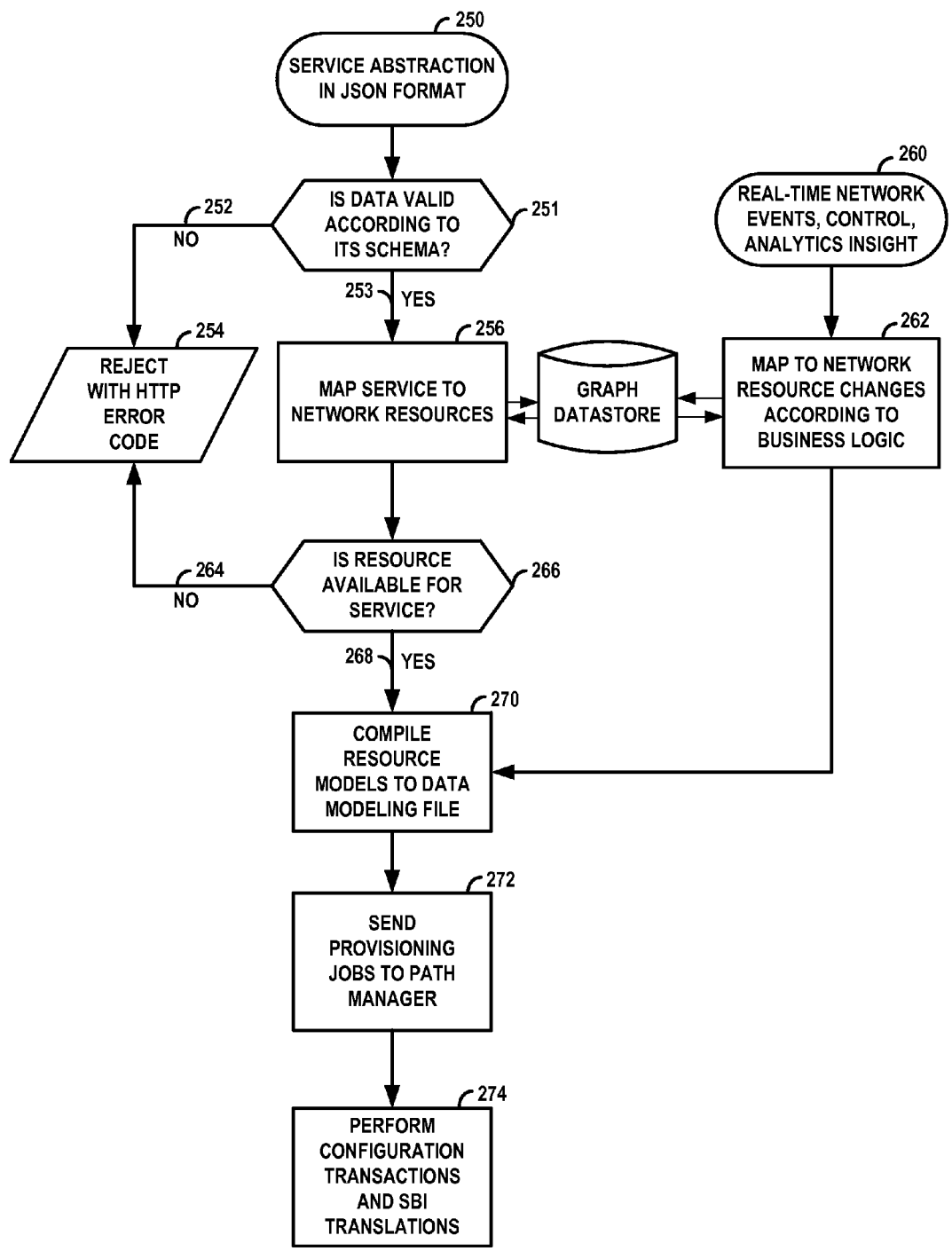
FIG. 6 is flowchart that illustrates example operations of a controller to provision services using a graph database, in accordance with techniques of the disclosure.

As further described in FIG. 6, upon receiving the JSON message, service provisioning module 26 may validate the message against one or more schemas, and either reply with an error to service provide system 24 if the message is not valid, or continue processing the message if the message is valid. Service provisioning module 26 may translate the information included in the service abstraction into a query. For instance, service provisioning module 26 may structure the query to include a condition that requires both "Citibank" and "Wells Fargo." In addition, service provisioning module 26 may determine one or more rules that must be satisfied to establish a L2 VPN, and structure the query based on the rules. For instance, a rule to provision a L2 VPN may require at least one provider edge router, the provider edge router must equipped with protocols and/or functionality to configure a L2 VPN, and the at least one provider edge router must include at least one interface to forward network traffic for the L2 VPN. Service provisioning module 26 may express each rule as one or more parameters in the query. Although the previous rule provides an example of conditions that must be satisfied to provision the L2 VPN, the previous rule may include other conditions not described or may include fewer conditions than described in the previous rule. Furthermore, although the previous rule provided an example of conditions for a L2 VPN service, a rule may define conditions for any service.

Service provisioning module 26 may structure the query to be conditioned on "Citibank," "Wells Fargo," and the one or more rules to establish a L2 VPN. Service provisioning module 26 may apply the query to graph 202 to determine whether resources are available to fulfill the request. In the example of FIG. 5, graph database 202 may initiate the query at vertex 204 representing customer "Citibank." Graph database 202 may implement any number of one or more graph searching algorithms to execute the query. Examples of graph algorithms may include shortest-path, all shortest paths, Dijkstra's algorithm, depth-first search, breadth-first search, spreading activation, to name a few.

Graph database 22 may determine the relationships specified by one or more of edges 206, 208 to vertexes 210 and 212, respectively. For instance, edge 206 indicates that customer "Citibank" represented by vertex 204 has a L2 VPN service represented by vertex 210. Edge 208 indicates that customer "Citibank" represented by vertex 204 has a L3 VPN service represented by vertex 212. Graph database 22 may therefore determine that edge 206 satisfies a condition of the query that an L2 VPN service is available.

Since edge 206 satisfies the query for an L2 VPN, while edge 208 does not because it specifies an L3 VPN, graph database 22 may continue traversing graph 202 at vertex 210. Graph database 22 may determine the relationships specified by one or more of edges 214, 216 to vertexes 218 and 220, respectively. For instance, edge 214 indicates that the network device represented by vertex 218 is used by the L2 VPN service represented by vertex 210. Edge 216 indicates that the L2 VPN service represented by vertex 210 has a site represented by vertex 220. Graph database 22 may therefore determine that edge 214 satisfies a condition of the query that a network device exists for the L2 VPN service. In other words, to determine that a set of the plurality of network resources satisfies the service request, service provisioning module 26 may determine for a respective edge of the plurality of edges, a type of respective relationship between first and second network resources that respectively correspond to first and second vertexes of the respective edge; and responsive to determining that the type of relationship satisfies the query, service provisioning module 26 may select the first and second network resources to provide the network service within the network, as further described below.

Since edge 214 satisfies the query for an L2 VPN, while edge 216 does not, graph database 22 may continue traversing graph 202 at vertex 218. Graph database 22 may determine the relationships specified by one or more of edges 220, 222, 224, and 226 to vertexes 212, 228, 220, and 218, respectively. For instance, edge 222 indicates that the network device represented by vertex 218 is used by the L2 VPN service represented by edge 222. Graph database 22 may make similar determination for each of edges 222-226. Graph database 22 may determine that edge 222 satisfies a condition of the query that a network device exists for the L2 VPN service to the customer "Wells Fargo."

Since edge 222 satisfies the query for an L2 VPN, graph database 22 may continue traversing graph 202 at vertex 228. Graph database 22 may determine the relationship specified by edge 230 to vertex 206. For instance, edge 230 indicates that the customer "Wells Fargo" represented by vertex has an L2 VPN service represented by vertex 228. Graph database 22 may determine that edge 230 satisfies a condition of the query that an L2 VPN service exists for customer "Wells Fargo." Because a path through graph 202 satisfies the query, service provisioning module 26 determines that sufficient resources exist in the service provider network to fulfill the request for the L2 VPN service between customers "Citibank" and "Wells Fargo."

If the query determined that there were not sufficient resources to provision the L2 VPN service, service provisioning module 26 would send an error message to service provider system 24. However, because sufficient resources do exist in the example of FIG. 5, service provisioning module 26 selects the one or more corresponding resources, and generates one or more resource models (further described in FIG. 6) to configure the states of one or more network devices to provision the L2 VPN service. Service provisioning module 26 configures each of the one or more network devices based on the one or more resource models to provision the L2 VPN service.

As described above with respect to FIG. 5, the traversal of vertexes and edges in graph 202 may be faster and/or more computationally efficient than conventional relational databases and other non-graph database implementations. By modeling relationships between network resources as edges in a graph, graph database 22 may examine a subset or fewer than all of the possible relationships in the service provider network, thereby improving the performance of querying and provisioning services. Techniques of the disclosure that implement resources and corresponding relationships in a graph database may reduce the complexity of queries required to determine whether services can be established in the service provisioning network, thereby simplifying implementation and maintenance of information that describes the service provider network.

In some examples, service provisioning module 26 may update graph 202 of graph database 22 in realtime and/or responsive to the occurrence a network event. Although described with respect to topology module 164, service provisioning module 26 may also update graph 202 of graph database 22 as described herein with respect to service provisioning module 26. As described in FIG. 1, network events may include but are not limited to link and/or device failures in the network determined by SDN controller 19. In some examples, a network event may include a rate that satisfies a threshold, such as bandwidth that falls below a threshold that indications congestion. As another example, a network event may include a rate of dropped packets that satisfies a threshold or a degree of confidence that satisfies a threshold that a packet flow includes a computer virus or a specific type of media. A network event may, generally, be any network occurrence that is determinable by a computing device, such as SDN controller 19.

As an example, topology module 164 may determine a network event has occurred that indicates at least one change to the network. For instance, topology module 164 may determine that a link failure has occurred between two network devices. Responsive to detecting the link failure, topology module 164 may update, in real-time and based at least in part on the network event, at least one edge or at least one vertex in the graph database that corresponds to at least one of the network resources that is affected by the network event. For instance, if a service exists that uses the failed link, topology module 164 may remove one or more edges from graph 202 that represent the relationship between the service, the link, and the network devices connected by the link. Topology module 164 may also update attribute information for one or more of the vertexes and edges to reflect the changed state of the network.

In some examples, responsive to detecting the network event, service provisioning modules 26 may automatically re-provision the service affected by the network event using other network resources by querying graph 202 of graph database 22. For instance, in the event of the link failure, service provisioning module 26 may traverse graph 202 to determine if an alternate path exists in the network to re-provision the service that was affected by the link failure. If an alternative path exists, service provisioning module 26 may automatically re-provision the service using the alternate path. To re-provision the service, service provisioning module 26 may configure one or more network resources that were determined using graph 202, and update graph 202 to reflect the changed state of the network that now uses the newly configured network resources.

As such, network events that cause network resources to change, e.g., device failure, link failure, device overloaded, link congestion, the changes to network resources will be reflected in the graph database as values of vertex properties. It ensures a fast and accurate fault correlation. When required, services can be re-evaluated and redeployed according to pre-defined policies. In this way, techniques of the disclosure may use graph database 22 and graph 202 to rapidly and automatically fail over to re-map services. If the service cannot be re-provisioned, service provisioning module 26 may send one or more alerts to the customer to indicate that the service cannot be re-provisioned automatically.

In some examples, service provisioning system 26 may also include a service recommendation system. The service recommendation system may perform analytics on customers and their deployed services, and propose possible service packages that will likely be accepted by customers. Specifically, the service recommendation system may query graph database 22 to determine whether a customer and/or the customer's deployed services indicate a probability that a service package is likely to be accepted by the customer. Responsive to determining that the probability satisfies a threshold that a service package is likely to be accepted by the customer, the service recommendation system of service provisioning system 26 may notify the customer of the service package. Alternatively, the service recommendation system may notify a representative of the service provider network, who then initiates contact with the customer about the service package.

In some examples, service provisioning module 26 may simulate the provisioning of a service in the network before actually configuring nodes 10 to provide the service. In some examples, simulation may occur when indicated by a customer in the service request, while in other examples, simulation may occur to query for and configure a network service. By simulating the provisioning of the service, service provisioning module 26 may determine whether unforeseen issues may arise prior to actually configuring the service. Service provisioning module 26 may, to help with service planning, take a sandbox approach to evaluate and understand how a specific service can be deployed, and its potential impact to the network, by applying temporary property labels to the nodes and relationships in the graph database and performing the relevant queries.

As an example, when querying at least a portion of the plurality of vertexes and plurality of edges of graph database 22 based at least in part on the service request, service provisioning module 26 may applying at least one tag to at least one vertex or one edge of the graph database. The tag may indicate the type of change that will occur to the vertex or edge when the service nodes are actually configured. In other examples, the tag may only indicate that the vertex or edge will change when the service nodes are actually configured. In any case, service provisioning module 26 may include tags on one or more edges and vertexes that corresponds to the resources and relationships that would be affected by provisioning service.

Service provisioning module 26 may then simulate, using the at least one tag, the configuring of the set of the plurality of network resources to provide the network service within the network. For instance, service provisioning module 26 may perform all or any of the various techniques as described with respect to FIGS. 1-6, except that service nodes 10 are not actually configured to provision the service. In other words, the state of the service nodes remains unchanged when simulating the configuring of the set of the plurality of network resources.

Service provisioning module 26 may determine, based on the simulating, whether the set of the network resources can satisfy the service request. If a customer requested the simulation as part of the service request, service provisioning module 26 may send a message to the customer (e.g., at service provider system 24) indicating the results of the simulation. If the simulation was performed as part of the query and the set of the network resources can satisfy the service request, service provisioning module 26 will configure service nodes 10 to provision the service. If the simulation was performed as part of the query and the network resources cannot satisfy the service request, service provisioning module 26 may send a message indicating an error code to the customer (e.g., at service provider system 24).

FIG. 6 is flowchart that illustrates example operations of a controller to provision services using a graph database, in accordance with techniques of the disclosure. While described with respect to service provisioning module 26 in FIGS. 1-5, the techniques may be implemented by any type of network device capable of performing one or more functions of SDN controller 19 described in the disclosure.

In the example of FIG. 6, service provisioning module 26 receives a data-interchange formatted message, such as a JSON message, from service provider system 24 (250). The data-interchange formatted message may specify a service request to establish a VPN service between two customer sites. Service provisioning module 26 may validate the data-interchange formatted message against one or more schemas (251). If the data included in the data-interchange formatted message is not valid according the one or more schemas (176), service provisioning module 26 rejects the service request. In some examples, service provisioning module 26 rejects the service request by sending an HTTP error code (e.g., HTTP error code 403) to service provider system 24 (178).

If data included in the data-interchange formatted message is valid (253), service provisioning module 26 may map the request service to network resources to determine whether sufficient resources are available to service the request (180). For instance, service provisioning module 26 may generate a query to perform on graph database 22. To generate the query, service provisioning module 26 may translate a service abstraction included in the data-interchange formatted message into parameters according to a query language for a graph database 22. For instance, if a VPN service requires a provider edge router at each customer site and a route between the two provider edge routers, service provisioning module 26 may generate a query to search the graph for two resources that are provider edge routers, wherein each respective provider edge router is associated with a respective customer site specified in the service abstraction of the data-interchange formatted message. By mapping the requested VPN service as specified in the service abstraction to parameters in a query, service provisioning module 26 can search graph database 22 to determine whether resources are available to fulfill the request.

To query graph database 22, service provisioning module 26 may traverse one or more edges of the graph in accordance with the query to determine whether relationships between the vertexes satisfy the query. Taking the example service abstraction of FIG. 1, the customer "citi" may request a VPN between sites "SFO" and "NYC". Service provisioning module 26 may traverse one or more edges of the graph in graph database 22 to evaluate the conditions that the respective provider edge routers are coupled to the respective sites, that a route exists between the two provider edge routers, and that each of the two provider edge routers is configurable to provide a VPN. Service provisioning module 26 may, when traversing the graph, evaluate the relationships between the resources to determine whether the relationships satisfy the conditions of the query. In some examples, service provisioning module 26 may traverse the graph to evaluate other conditions or fewer conditions than described in the current example.

Service provisioning module 26 may, based on the query, determine whether resources are available to provide the VPN service (266). If sufficient resources are not available to fulfill the request (264), service provisioning module may send a response to service provider system 24 that rejects the service request. In some examples, service provisioning module 26 rejects the service request by sending an HTTP error code (e.g., HTTP error code 403) to service provider system 24 (178). If sufficient resources are available to fulfill the request (268), service provisioning module 26 may generate and/or compile resource models to one or more data modeling files (270).

In some examples, path provisioning module 174 may generate and/or compile resource models using the YANG data modeling language, published as RFC 6020. YANG provides a standard modeling language to set the parameters of network equipment managed by SDN controller 19. In some examples, YANG is used with one or more protocols, such as SNMP, NetConf, TL1, to retrieve and set parameters that indicate the state of network equipment. YANG may be used to model the state of network elements and configuration data. Although the example of FIG. 6 is described with respect to YANG, any suitable protocol may be used. In the example of FIG. 6, path provisioning module 174 may compile any resource models needed to provision the network service into one or more modeling files according to the YANG standard. Alternatively or in addition to compiling resource models, path provisioning module 174 may directly configure service nodes 10 using southbound API 152.

Upon compiling the one or more modeling files, path provisioning module 174 may execute service provisioning jobs (248). Path provisioning module 174 may determine the contents of the one or more data modeling files to provision the VPN service. Path provisioning module 174 may perform configuration transactions and Subscriber Bus Interface (SBI) translations (274). To perform the configuration transactions and SBI translations, path provisioning module 174 may translate the YANG-standard formatted message to device-specific configuration information. Path provisioning module 174 then configures one or more service nodes, which correspond to the device-specific configuration information. In this way, service provisioning module 26 changes the states of one or more service nodes to provision the service. In other words, to configure the set of network resources to provide the network service within the network, path provisioning module 174 may generate, based at least in part on the set of network resources that satisfy the service request, one or more data models that define one or more configurations of one or more service nodes to provide the network service. Path provisioning module 174 may then configure, based at least in part on the one or more data models, the one or more service nodes to provide the network service.

In some examples, the graph of graph database 22 is updated to reflect the changes to the network resources when provisioning the service after service provisioning module 26 confirms that the configuration of the service nodes was successful. In other examples, the graph of graph database 22 is updated after determining that the requested service can be fulfilled but prior to making the changes to the service nodes. In either case, graph database includes at least one sub-graph that corresponds to the network service for a particular customer. The sub-graph includes the set of the plurality of vertexes and the plurality of edges that collectively indicate relationships between network resources to provision the network service for the particular customer of the network.

Service provisioning module 26 may update, based at least in part on configuring the set of the plurality of network resources to provide the network service within the network, at least one edge or at least one vertex in the graph database that corresponds to at least one of the network resources that satisfy the service request. If an error occurs when configuring the service nodes, service provisioning module 26 may roll back the state of the graph of graph database 22 to indicate that the changes to the service nodes were not completed. In any case, when network resources are mapped to a specific service, they may be reserved; once service is deployed, the resources will be taken out of the available resources pool (e.g., marked with the label "USED" with the relationship "USEDBY" pointing to the service).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

Included below is an example schema against which service provisioning module 26 may validate a data-interchange formatted message:

```
{
    "type" : "object",
    "schema" : "http://json-schema.org/draft-03/schema",
    "id" : "http://jsonschema.net",
    "required" : false,
    "properties" : {
        "customer" : {
            "type" : "string",
            "id" : "http://jsonschema.net/customer",
            "required" : true
        },
        "qos_profile" : {
            "type" : "string",
            "id" : "http://jsonschema.net/qos_profile",
            "required" : false
        },
        "service_name" : {
            "type" : "string",
            "id" : "http://jsonschema.net/service_name",
            "required" : true
        },
        "service_type" : {
            "type" : "string",
            "id" : "http://jsonschema.net/service_type",
            "required" : true
        },
        "sites" : {
            "type" : "array",
            "id" : "http://jsonschema.net/sites",
            "required" : true,
```

```
            "items" : {
                "type" : "string",
                "id" : "http://jsonschema.net/sites/0",
                "required" : false
            }
        },
        "topology" : {
            "type" : "string",
            "id" : "http://jsonschema.net/topology",
            "required" : false
        }
    }
}
```

What is claimed is:

1. A method comprising:

storing a graph database comprising a plurality of vertexes, the plurality of vertexes including a first subset of vertexes representing a plurality of network resources and a second subset of vertexes representing a plurality of network services, and the graph database comprising a plurality of edges between a set of the plurality of vertexes, each respective edge indicating a relationship between at least one network resource of the plurality of network resources and at least one network service of the plurality of network services;

receiving, at an application programming interface of a software defined network (SDN) controller, a data-interchange formatted message that indicates a service request to configure a network service within a network;

querying, at least a portion of the plurality of vertexes and plurality of edges of the graph database based at least in part on the service request, to determine whether at least one network resource of the plurality of network resources and at least one network service of the plurality of network services can satisfy the service request to provision the network service within the network; and responsive to determining that the at least one network resource and the at least one network service can satisfy the service request, configuring, by the SDN controller, the at least one network resource and the at least one network service to provide the network service within the network.

2. The method of claim 1, wherein querying the graph database comprises:

determining a service abstraction included in the data-interchange formatted message, wherein the service abstraction includes a plurality of parameters that define the service request;

translating, based at least in part on the parameters, the service request into a query usable to determine whether the at least one network resource and the at least one network service satisfies the service request; and determining, based at least in part on the query, that the at least one network resource and the at least one network service satisfies the service request.

3. The method of claim 2, wherein determining that the at least one network resource and the at least one network service satisfies the service request comprises:

determining for a respective edge of the plurality of edges, a type of respective relationship between the at least one network resource and the at least one network service that respectively correspond to first and second vertexes of the respective edge; and responsive to determining that the type of relationship satisfies the query, selecting the at least one network resource and the at least one network service to provide the network service within the network.

4. The method of claim 1, wherein configuring the at least one network resource and the at least one network service to provide the network service within the network comprises:

generating, based at least in part on the at least one network resource and the at least one network service that satisfy the service request, one or more data models that define one or more configurations of one or more service nodes to provide the network service; and configuring, based at least in part on the one or more data models, the one or more service nodes to provide the network service.

5. The method of claim 1, further comprising:

updating, based at least in part on configuring the at least one network resource and the at least one network service to provide the network service within the network, at least one edge or at least one vertex in the graph database that corresponds to at least one network resource or network service that satisfy the service request.

6. The method of claim 1, wherein querying at least a portion of the plurality of vertexes and plurality of edges of the graph database based at least in part on the service request comprises:

applying at least one tag to at least one vertex or one edge of the graph database;

simulating, using the at least one tag, the configuring of the at least one network resource and the at least one network service to provide the network service within the network; and determining, based on the simulating, whether the at least one network resource and the at least one network service can satisfy the service request.

7. The method of claim 1, further comprising:

determining, based at least in part on a schema, whether the format of the data-interchange formatted message is valid; and if the format of the data-interchange formatted message is valid, querying, at least the portion of the plurality of vertexes and plurality of edges of the graph database based at least in part on the service request, and if the format of the data-interchange formatted message is not valid, sending an error message to a sender of the data-interchange formatted message.

8. The method of claim 1, further comprising:

determining a network event has occurred that indicates at least one change to the network; and updating, in real-time and based at least in part on the network event, at least one edge or at least one vertex in the graph database that corresponds to at least one of the network resource or network service that is affected by the network event.

9. The method of claim 1, wherein the data-interchange formatted message is a JavaScript Object Notation (JSON) message and the interface is a Representational State Transfer (REST) interface.

10. The method of claim 1, wherein the graph database includes at least one sub-graph that corresponds to the network service for a particular customer, the sub-graph comprising the set of the plurality of vertexes and the plurality of edges, wherein the plurality of edges collectively indicate relationships between network resources to provision the network service for the particular customer of the network.

11. A non-transitory computer-readable medium comprising instructions that cause at least one processor of a controller device to:
    store a graph database comprising a plurality of vertexes, the plurality of vertexes including a first subset of vertexes representing a plurality of network resources and a second subset of vertexes representing a plurality of network services, and the graph database comprising a plurality of edges between a set of the plurality of vertexes, each respective edge indicating a relationship between at least one network resource of the plurality of network resources and at least one network service of the plurality of network services;
    receive, at an application programming interface of the controller device, a data-interchange formatted message that indicates a service request to configure a network service within a network;
    query, at least a portion of the plurality of vertexes and plurality of edges of the graph database based at least in part on the service request, to determine whether at least one network resource of the plurality of network resources and at least one network service of the plurality of network services can satisfy the service request to provision the network service within the network; and
    responsive to determining that the at least one network resource and the at least one network service can satisfy the service request, configure the at least one network resource and the at least one network service to provide the network service within the network.

12. A controller device comprising:
    at least one processor;
    at least one memory to store a graph database comprising a plurality of vertexes, the plurality of vertexes including a first subset of vertexes representing a plurality of network resources and a second subset of vertexes representing a plurality of network services, and the graph database comprising a plurality of edges between a set of the plurality of vertexes, each respective edge indicating a relationship between at least one network resource of the plurality of network resources and at least one network service of the plurality of network services;
    a service provisioning module that receives, at an application programming interface of the controller device, a data-interchange formatted message that indicates a service request to configure a network service within a network,
    wherein the service provisioning module queries, at least a portion of the plurality of vertexes and plurality of edges of the graph database based at least in part on the service request, to determine whether at least one network resource of the plurality of network resources and at least one network service of the plurality of network services can satisfy the service request to provision the network service within the network; and
    a path provisioning module that, responsive to determining that the at least one network resource and the at least one network service can satisfy the service request, configures the set of the plurality of network resources to provide the network service within the network.

13. The controller device of claim 12, wherein the service provisioning module:
    determines a service abstraction included in the data-interchange formatted message, wherein the service abstraction includes a plurality of parameters that define the service request;
    translates, based at least in part on the parameters, the service request into a query usable to determine whether the at least one network resource and the at least one network service satisfies the service request; and
    determines, based at least in part on the query, that the at least one network resource and the at least one network service satisfies the service request.

14. The controller device of claim 13, wherein the service provisioning module:
    determines for a respective edge of the plurality of edges, a type of respective relationship between a first vertex that corresponds to a network resource and a second vertex that corresponds to a network service; and
    responsive to determining that the type of relationship satisfies the query, selects the first and second vertexes to provide the network service within the network.

15. The controller device of claim 12, wherein the service provisioning module:
    generates, based at least in part on the at least one network resource and the at least one network service that satisfy the service request, one or more data models that define one or more configurations of one or more service nodes to provide the network service; and
    configures, based at least in part on the one or more data models, the one or more service nodes to provide the network service.

16. The controller device of claim 12, wherein the service provisioning module:
    updates, based at least in part on configuring the at least one network resource and the at least one network service to provide the network service within the network, at least one edge or at least one vertex in the graph database that corresponds to at least one of network resource or network service that satisfy the service request.

17. The controller device of claim 12, wherein the service provisioning module:
    applies at least one tag to at least one vertex or one edge of the graph database;
    simulates, using the at least one tag, the configuring of the at least one network resource and the at least one network service to provide the network service within the network; and
    determines, based on the simulating, whether the at least one network resource and the at least one network service can satisfy the service request.

18. The controller device of claim 12, wherein the service provisioning module:
    determines, based at least in part on a schema, whether the format of the data-interchange formatted message is valid; and
        if the format of the data-interchange formatted message is valid, querying, at least the portion of the plurality of vertexes and plurality of edges of the graph database based at least in part on the service request, and
        if the format of the data-interchange formatted message is not valid, sending an error message to a sender of the data-interchange formatted message.

19. The controller device of claim 12, wherein the service provisioning module:

determines a network event has occurred that indicates at least one change to the network; and updates, in real-time and based at least in part on the network event, at least one edge or at least one vertex in the graph database that corresponds to at least one of the network resource or network service that is affected by the network event.

20. The controller device of claim 12, wherein the data-interchange formatted message is a JavaScript Object Notation (JSON) message and the interface is a Representational State Transfer (REST) interface.

21. The controller device of claim 12, wherein the graph database includes at least one sub-graph that corresponds to the network service for a particular customer, the sub-graph comprising the set of the plurality of vertexes and the plurality of edges, wherein the plurality of edges collectively indicate relationships between at least one network resource and at least one network service to provision the network service for the particular customer of the network.

* * * * *